(12) United States Patent
Shahar et al.

(10) Patent No.: US 12,253,954 B1
(45) Date of Patent: Mar. 18, 2025

(54) FLOATING INTERNAL CONTEXT MEMORY

(71) Applicant: MELLANOX TECHNOLOGIES, LTD., Yokneam (IL)

(72) Inventors: Ariel Shahar, Jerusalem (IL); Shay Ben-Haim, Tel Aviv (IL); Eyal Davidovitz, Kfar Saba (IL); Oz Woller, Yokneam Illit (IL)

(73) Assignee: Mellanox Technologies, Ltd, Yokneam (IL)

( * ) Notice: Subject to any disclaimer, the term of this patent is extended or adjusted under 35 U.S.C. 154(b) by 40 days.

(21) Appl. No.: 18/459,047

(22) Filed: Aug. 31, 2023

(51) Int. Cl.
*G06F 12/10* (2016.01)
*G06F 12/0882* (2016.01)
*G06F 12/1009* (2016.01)

(52) U.S. Cl.
CPC ...... *G06F 12/1009* (2013.01); *G06F 12/0882* (2013.01)

(58) Field of Classification Search
CPC .......................... G06F 12/1009; G06F 12/0882
USPC ......................................................... 711/206
See application file for complete search history.

(56) References Cited

U.S. PATENT DOCUMENTS

2018/0365141 A1* 12/2018 Dragojevic ......... G06F 12/0246
2021/0064537 A1* 3/2021 Speier ................. G06F 12/1027

* cited by examiner

*Primary Examiner* — Hua J Song
(74) *Attorney, Agent, or Firm* — Meitar Patents Ltd.; Daniel Kligler

(57) ABSTRACT

In one embodiment, a processing device includes a memory to store a plurality of memory pages having corresponding physical memory addresses in the memory, store an active multilevel page table (MPT) mapping virtual to physical memory addresses for corresponding allocated memory pages stored in the memory, and store a floating MPT at least partially mapping virtual to physical memory addresses for corresponding spare memory pages stored in the memory, the floating and active MPT using a common mapping scheme, and a processor to receive a request to add a virtual to physical address mapping for more memory pages of the plurality of memory pages to the active MPT, and in response to receiving the request, adjoin at least part of the floating MPT to the active MPT so that the active MPT provides the virtual to physical address mapping for at least some memory pages of the spare memory pages.

26 Claims, 7 Drawing Sheets

FLOATING INTERNAL CONTEXT MEMORY

FIELD OF THE INVENTION

The present invention relates to computer systems, and in particular, but not exclusively to, memory mapping.

BACKGROUND

Virtual memory may be used (e.g., by operating systems) to allow processes to work with contiguous sections of memory, while the physical memory corresponding to the virtual memory of a process is typically dispersed across different areas of physical memory, or may have been moved to other storage, such as a non-volatile memory. Virtual addresses are used by the program executed by the accessing process, while physical addresses are used by the hardware, or more specifically, by the random-access memory subsystem. When a process requests access to data in memory, the hardware finds the physical memory address mapped to the requested virtual address provided by the process.

The mapping between virtual and physical memory addresses may be provided by a page table, with each mapping also known as a page table entry (PTE).

Multilevel Paging is a paging scheme that consists of two or more levels of page tables in a hierarchical manner. It is also known as hierarchical paging. The entries of the level-1 page table are pointers to the level-2 page-table, and entries of the level-2 page-tables are pointers to a level-3 page-table, and so on. The entries of the last level page-table store actual frame information of the physical memory address being sought. The level 1 page table includes a single page-table, and the address of that page-table is stored in a Page Table Base Register (PTBR).

SUMMARY

There is provided in accordance with an embodiment of the present disclosure, a processing device, including a memory to store a plurality of memory pages having corresponding physical memory addresses in the memory, store an active multilevel page table (MPT) mapping virtual memory addresses to physical memory addresses for corresponding allocated memory pages of the plurality of memory pages stored in the memory, and store a floating MPT at least partially mapping virtual memory addresses to physical memory addresses for corresponding spare memory pages of the plurality of memory pages stored in the memory, the floating MPT and the active MPT using a common mapping scheme, and a processor to receive a request to add a virtual to physical address mapping for more memory pages of the plurality of memory pages to the active MPT, and in response to receiving the request, adjoin at least part of the floating MPT to the active MPT so that the active MPT provides the virtual to physical address mapping for at least some memory pages of the spare memory pages.

Further in accordance with an embodiment of the present disclosure the processor is to generate the floating MPT and store the floating MPT in the memory.

Still further in accordance with an embodiment of the present disclosure the processor is to add at least one page table entry (PTE) that exists in the floating MPT to a given page of the active MPT in order to add the virtual to physical address mapping for the at least some memory pages of the spare memory pages to the active MPT.

Additionally in accordance with an embodiment of the present disclosure the at least one PTE provides a physical memory address of at least one page of the floating MPT, which includes PTEs providing physical memory addresses of the at least some memory pages of the spare memory pages, or pages in a lower level of the floating MPT.

Moreover, in accordance with an embodiment of the present disclosure the processor is to remove the at least one PTE from the floating MPT.

Further in accordance with an embodiment of the present disclosure the processor is to close a gap in the floating MPT created by removing the at least one PTE from the floating MPT.

Still further in accordance with an embodiment of the present disclosure the processor is to traverse the active MPT including the adjoined at least part of the floating MPT, in order to translate a given virtual memory address to a given physical memory address of a given one of the spare memory pages.

Additionally in accordance with an embodiment of the present disclosure the given virtual memory address includes parts, and the processor is to traverse the active MPT to find the given physical memory address of the given spare memory page based on applying the parts of the given virtual memory address to corresponding levels of the active MPT.

Moreover, in accordance with an embodiment of the present disclosure the processor is to follow physical memory addresses in page table entries (PTEs) in corresponding levels of the active MPT to find the given physical memory address of the given spare memory page, indices of the PTEs in the corresponding levels of the active MPT are indicated by the parts of the given virtual memory address.

Further in accordance with an embodiment of the present disclosure the active MPT and the floating MPT are tree data structures.

Still further in accordance with an embodiment of the present disclosure a quantity of the at least some memory pages of the spare memory pages being mapped is equal to 2 to the power of an integer number n, and the virtual memory addresses of the at least some memory pages being mapped in the active MPT are aligned such that n least significant bits of each of the virtual memory addresses are equal to zero.

Additionally in accordance with an embodiment of the present disclosure the processor is to add a mapping of the at least some memory pages of the spare memory pages to the active MPT in accordance with a minimum memory size.

Moreover, in accordance with an embodiment of the present disclosure the processor is to remove at least one page table entry (PTE) that exists in the active MPT to a given page of the floating MPT in order to remove a virtual to physical address mapping for unused memory pages from the active MPT to the floating MPT.

There is also provided in accordance with another embodiment of the present disclosure, a method, including storing a plurality of memory pages having corresponding physical memory addresses in a memory, storing an active multilevel page table (MPT) mapping virtual memory addresses to physical memory addresses for corresponding allocated memory pages of the plurality of memory pages stored in the memory, and storing a floating MPT at least partially mapping virtual memory addresses to physical memory addresses for corresponding spare memory pages of the plurality of memory pages stored in the memory, the floating MPT and the active MPT using a common mapping scheme, and receiving a request to add a virtual to physical address mapping for more memory pages of the plurality of memory pages to the active MPT, and in response to receiving the request, adjoining at least part of the floating MPT to the active MPT so that the active MPT provides the virtual to physical address mapping for at least some memory pages of the spare memory pages.

Further in accordance with an embodiment of the present disclosure, the method includes generating the floating MPT.

Still further in accordance with an embodiment of the present disclosure, the method includes adding at least one page table entry (PTE) that exists in the floating MPT to a given page of the active MPT in order to add the virtual to physical address mapping for the at least some memory pages of the spare memory pages to the active MPT.

Additionally in accordance with an embodiment of the present disclosure the at least one PTE provides a physical memory address of at least one page of the floating MPT, which includes PTEs providing physical memory addresses of the at least some memory pages of the spare memory pages, or pages in a lower level of the floating MPT.

Moreover, in accordance with an embodiment of the present disclosure, the method includes removing the at least one PTE from the floating MPT.

Further in accordance with an embodiment of the present disclosure, the method includes closing a gap in the floating MPT created by removing the at least one PTE from the floating MPT.

Still further in accordance with an embodiment of the present disclosure, the method includes traversing the active MPT including the adjoined at least part of the floating MPT, in order to translate a given virtual memory address to a given physical memory address of a given one of the spare memory pages.

Additionally in accordance with an embodiment of the present disclosure the given virtual memory address includes parts, and the traversing includes traversing the active MPT to find the given physical memory address of the given spare memory page based on applying the parts of the given virtual memory address to corresponding levels of the active MPT.

Moreover, in accordance with an embodiment of the present disclosure, the method includes following physical memory addresses in page table entries (PTEs) in corresponding levels of the active MPT to find the given physical memory address of the given spare memory page, wherein the indices of the PTEs in the corresponding levels of the active MPT are indicated by the parts of the given virtual memory address.

Further in accordance with an embodiment of the present disclosure the active MPT and the floating MPT are tree data structures.

Still further in accordance with an embodiment of the present disclosure a quantity of the at least some memory pages of the spare memory pages being mapped is equal to 2 to the power of an integer number n, and the virtual memory addresses of the at least some memory pages being mapped in the active MPT are aligned such that n least significant bits of each of the virtual memory addresses are equal to zero.

Additionally in accordance with an embodiment of the present disclosure, the method includes adding a mapping of the at least some memory pages of the spare memory pages to the active MPT in accordance with a minimum memory size.

Moreover, in accordance with an embodiment of the present disclosure, the method includes removing at least one page table entry (PTE) that exists in the active MPT to a given page of the floating MPT in order to remove a virtual to physical address mapping for unused memory pages from the active MPT to the floating MPT.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

Figure 1:
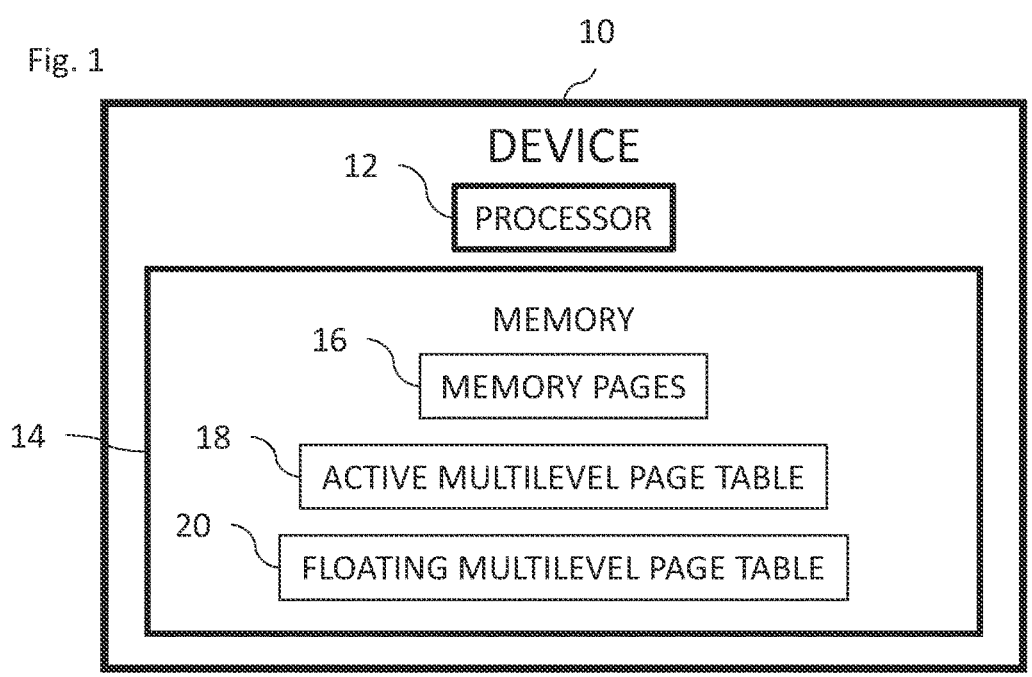
FIG. 1 is a block diagram view of a device constructed and operative in accordance with an embodiment of the present invention.

As previously mentioned, a page table and in particular a multilevel page table is used to provide a mapping between virtual and physical memory addresses for a process. Because a scalable amount of memory may be needed, a certain amount of physical memory is allocated to a process and mapped using the multilevel page table (MPT). When more memory is needed, the process may request one or more memory pages which are selected from spare memory pages by a page supplier (e.g., by the operating system) and mapped in the MPT for the process.

Due to the MPT structure, adding a memory page may require adding one or more entries to the MPT. For example, if the MPT has seven levels, in some cases adding a virtual to physical address mapping for one memory page to the MPT may only need adding one entry to the MPT (e.g., in the seventh (lowest) level of the MPT). In some cases, six new pages and seven new entries may need to be added to the MPT in order to add a virtual to physical address mapping for one memory page to the MPT.

One solution to providing spare pages is to use a linked list to store spare memory pages currently not associated with a virtual address but are available to be supplied by the page supplier, on demand, for adding mapping of new pages to the MPT. However, using a linked list leads to a problem, as follows. If the process needs a large resource, e.g., 512 MB, then the page supplier will need to allocate 128K pages (512 MB divided by 4 KB, assuming each memory page in 4 KB) in memory to provide the requested 512 MB. The page supplier would need to iterate the linked list 128K times and add the mapping of the pages to the MPT. Assuming each last hop MPT page (i.e., the lowest level in the MPT) includes 512 page-table entries (PTEs) referring to 512 physical memory pages, then adding 128K memory pages would require adding 256 last hop pages, as well as pages in upper levels of the MPT to reference the new last hop pages. Assuming it takes 4 microseconds to find an item in the linked list and add the mapping of the memory page to the MPT, it would take 512 milliseconds to iterate linked list. i.e., approximately half a second, which is too long for most processes.

Therefore, embodiments of the present invention provide a device which stores two MPT, an active MPT mapping virtual memory addresses to physical memory addresses for memory pages allocated to a process, and a floating MPT at least partially mapping virtual memory addresses to physical memory addresses for corresponding spare memory pages. The active MPT and the floating MPT use a common mapping scheme. In response to receiving a request to add virtual to physical address mapping for more memory pages to the active MPT, a page supplier of the device adjoins at least part of the floating MPT to the active MPT so that the active MPT also provides the virtual to physical address mapping for at least some of the spare memory pages. In this manner, a linked list may be avoided. The floating MPT may be stored in some unused region of the active MPT or in a different region of memory.

The process may be any suitable process, for example, a software process running on a CPU, or a hardware process such as packet processing in a network interface controller or switch. The functionality of the page supplier may be implemented with any one or more of the following: firmware, an operating system, and/or any suitable processing circuitry, and the selection may depend on the operating environment. For example, if the process is a software process, the page supplier may be implemented using an operating system, and if the process is a hardware process, the page supplier may be implemented using firmware or processing circuitry of a hardware processor. In some embodiments, the process and page supplier are executed in the same processing unit. In other embodiments, the process and the page supplier are executed in different processing units.

In some embodiments, adding mapping of multiple spare memory pages to the active MPT may involve copying one PTE from the floating MPT to the active MPT. The copied PTE provides a link from the active MPT to all the pages below that copied PTE in the floating MPT which in turn provide the physical memory addresses of the space memory pages. For example, if the PTE being copied is from level 5 of the floating MPT, and that PTE references pages in levels 6 and 7 of the floating MPT, which in turn provide physical addresses to spare memory pages, then the single PTE copied from level 5 of the floating MPT to level 5 of the active MPT allows the active MPT to provide virtual to physical address mapping for the spare memory pages via the preexisting structure of the floating MPT now adjoined to the active MPT.

For example, 256 last hop MPT pages can be referenced in one penultimate hop MPT page (e.g., either in the first half or the second half of that penultimate page) of the floating MPT. Therefore, just copying the 256 PTEs from the floating MPT into 256 PTEs of the same level of the active MPT provides references to the 256 last hop MPT pages of the floating MPT and provide virtual to physical address mapping to 128K memory pages or 512 MB.

Similarly, virtual to physical address mapping may be provided for 256K memory pages or 1 GB by copying a single PTE in a level above the penultimate level in the floating MPT to the level above the penultimate level in the active MPT.

The PTE(s) copied from the floating MPT to the active MPT are then removed from the floating MPT and the entries in the floating MPT may be rearranged, referred herein as closing the gap, described in disclosed embodiments. Embodiments of the present invention improve the way a computer or other processing device works by: providing better computer performance; providing higher processing speed; providing less latency; and reduced power consumption.

System Description

Reference is now made to FIG. 1, which is a block diagram view of a device 10 constructed and operative in accordance with an embodiment of the present invention. The device may be implemented as any suitable processing device, for example, a network interface controller device.

The device 10 includes a processor 12 and a memory 14. The memory 14 is configured to store a plurality of memory pages 16 having corresponding physical memory addresses in the memory 14. The memory 14 is configured to store an active multilevel page table (MPT) 18, which maps virtual memory addresses to physical memory addresses for corresponding allocated memory pages of the plurality of memory pages 16 stored in the memory 14. The memory 14 is configured to store a floating MPT 20, which at least partially maps virtual memory addresses to physical memory addresses for corresponding spare memory pages of the plurality of memory pages 16 stored in the memory 14. The floating MPT 20 and the active MPT 18 typically use a common mapping scheme. The memory 14 is configured to store other data used by the processor 12. The active MPT 18 and the floating MPT 20 may be tree data structures.

Figure 2:
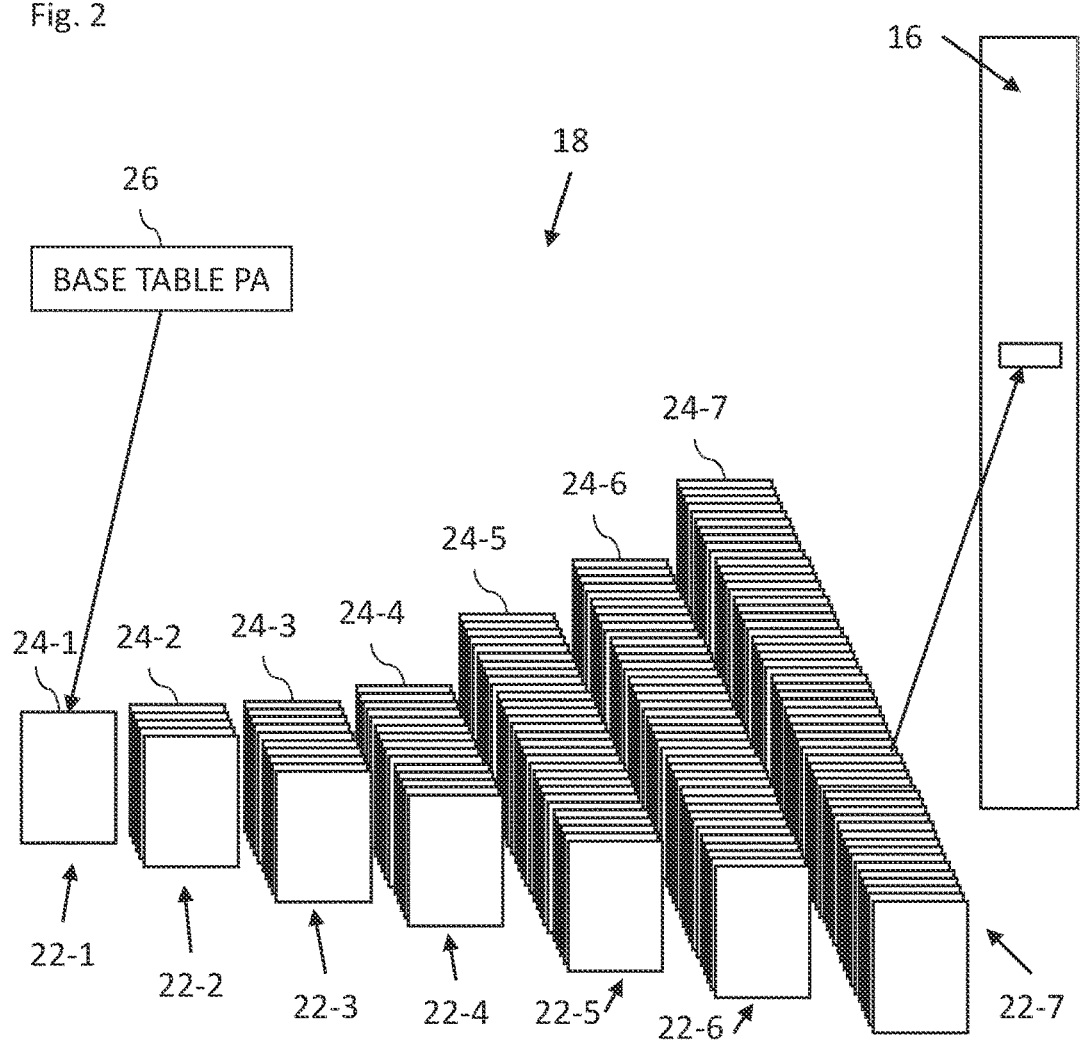
FIG. 2 is a schematic representation of an active multilevel page table for use in the device of FIG. 1.

Reference is now made to FIG. 2, which is a schematic representation of the active MPT 18 for use in the device 10 of FIG. 1. FIG. 2 shows that the active MPT 18 has multiple levels 22. In the example of FIG. 2, the active MPT 18 includes seven levels 22 (levels one to seven, or levels 22-1 to 22-7). The active MPT 18 may include two or more levels 22. The active MPT 18 includes multiple pages 24 (including page 24-1 in the first level 22-1 of the active MPT 18, pages 24-2 in the second level 22-2 of the active MPT 18, and so on, until pages 24-7 in the seventh level 22-7 of the active MPT 18). The active MPT 18 includes a base table page address register 26 which includes the physical memory address of page 24-1 in the first level 22-1 of the active MPT 18. Page 24-1 in the first level 22-1 of the active MPT 18 includes page table entries (PTEs) that include physical memory addresses of pages 24-2 in the second level 22-2 of the active MPT 18. Similarly, the pages 24-2 in the second level 22-2 of the active MPT 18 include PTEs that include physical memory addresses of pages 24-3 in the third level 22-3 of the active MPT 18, and so on. The pages 24-7 in the seventh level 22-7 of the active MPT 18 include PTEs that include physical memory addresses of memory pages 16 allocated to a process associated with the active MPT 18.

The process associated with the active MPT 18 may be any suitable process, for example, a software process running on a CPU (which may be part of the processor 12 or a separate processor), or a hardware process such as packet processing running in packet processing hardware (not shown) in a network interface controller or switch.

The processor 12 is configured to implement the functionality of a page supplier to generate mappings to memory pages, and may be implemented with any one or more of the following: firmware, an operating system, and/or any suitable processing circuitry, and the selection may depend on the operating environment. For example, if the process is a software process, the page supplier may be implemented using an operating system, and if the process is a hardware process, the page supplier may be implemented using firmware or processing circuitry of a hardware processor. In some embodiments, the process and page supplier are executed in the same processing unit (e.g., in processor 12). In other embodiments, the process and the page supplier are executed in different processing units.

Figure 3:
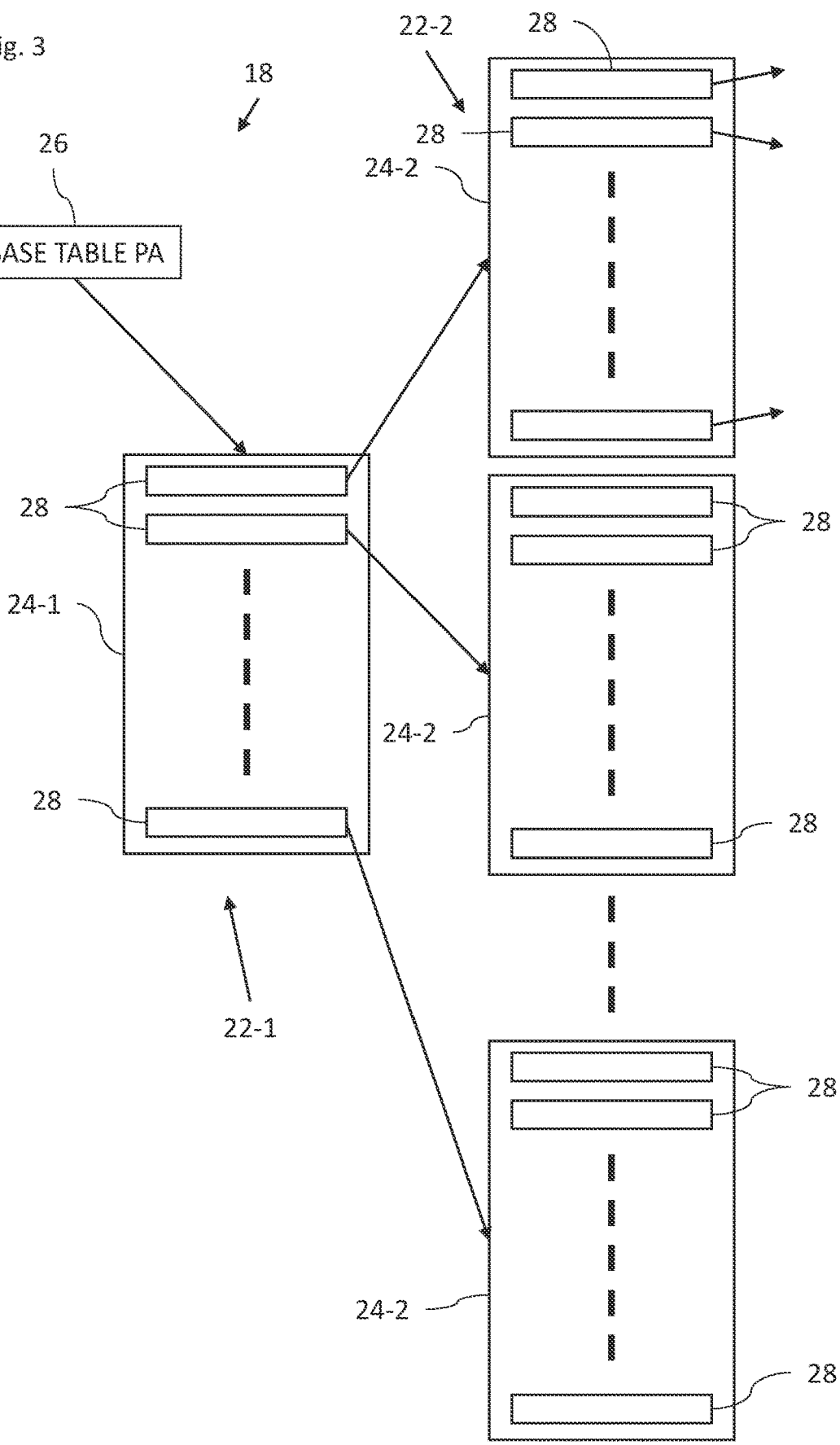
FIG. 3 is a schematic representation of part of the active multilevel page table of FIG. 2.

Reference is now made to FIG. 3, which is a schematic representation of part of the active multilevel page table 18 of FIG. 2. FIG. 3 shows pages 24 in the first level 22-1 and the second level 22-2 of the active MPT 18. Page 24-1 in the first level 22-1 of the active MPT 18 includes multiple page table entries (PTEs) 28. Each PTE 28 includes the physical memory address of a corresponding page 24-2 in the second level 22-2 of the active MPT 18. Each page 24-2 in the second level 22-2 of the active MPT 18 also includes multiple PTE 28, with each PTE 28 including the physical memory address of a corresponding page 24-3 in the third level 22-3 (FIG. 2) of the active MPT 18, and so on. In such a manner, each PTE 28 of each page 24 provides a physical memory address to a corresponding page 24 in the next lower level 22 of the active MPT 18. The PTEs 28 of the pages 24 in the last level (e.g., level 22-7) of the active MPT 18 include the physical memory addresses of the memory pages 16 (FIG. 2).

Figure 4:
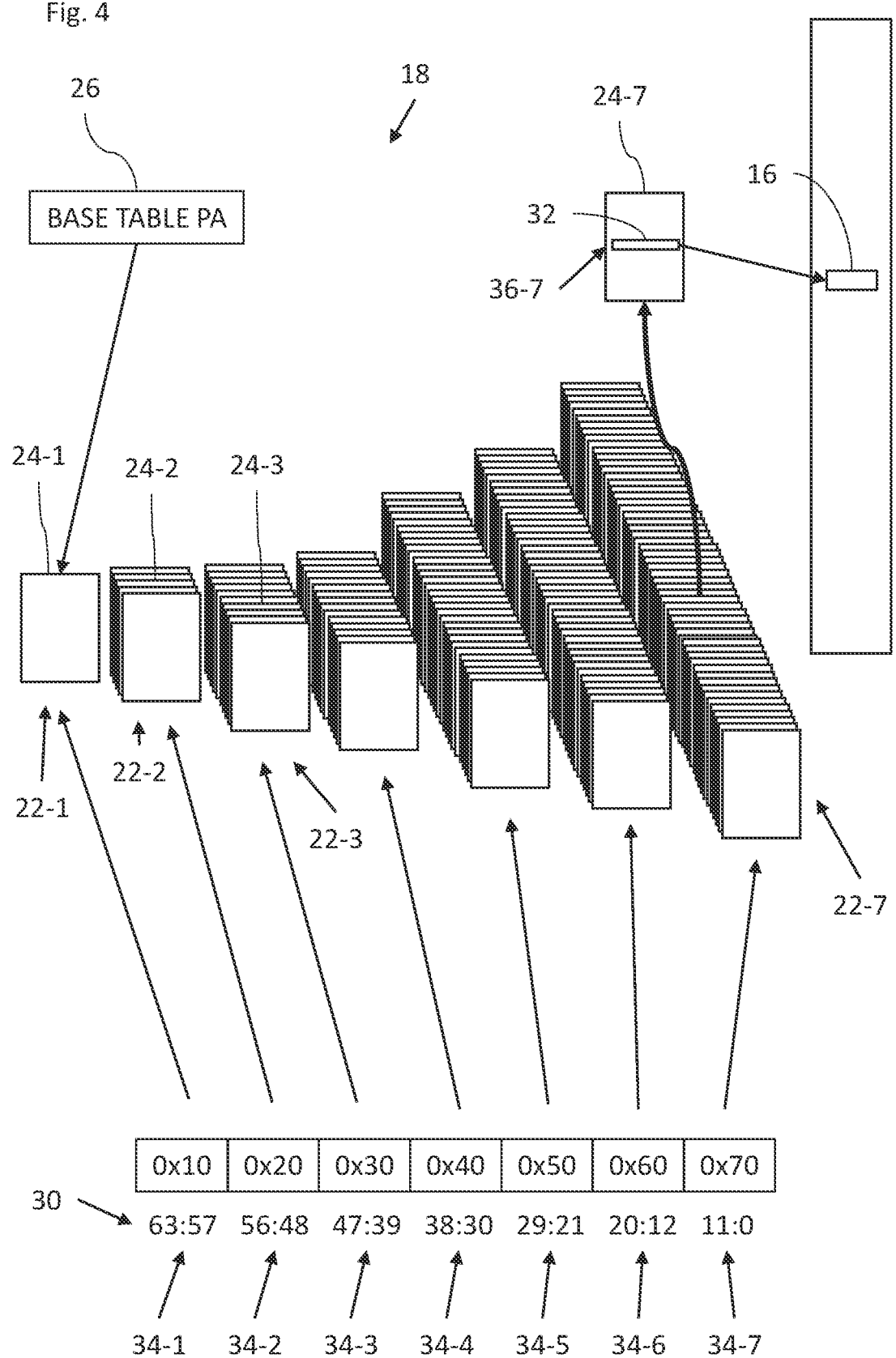
FIGS. 4-5 are schematic representations of the active multilevel page table of FIG. 2 illustrating how a virtual memory address is mapped to a physical memory address.
Figure 5:
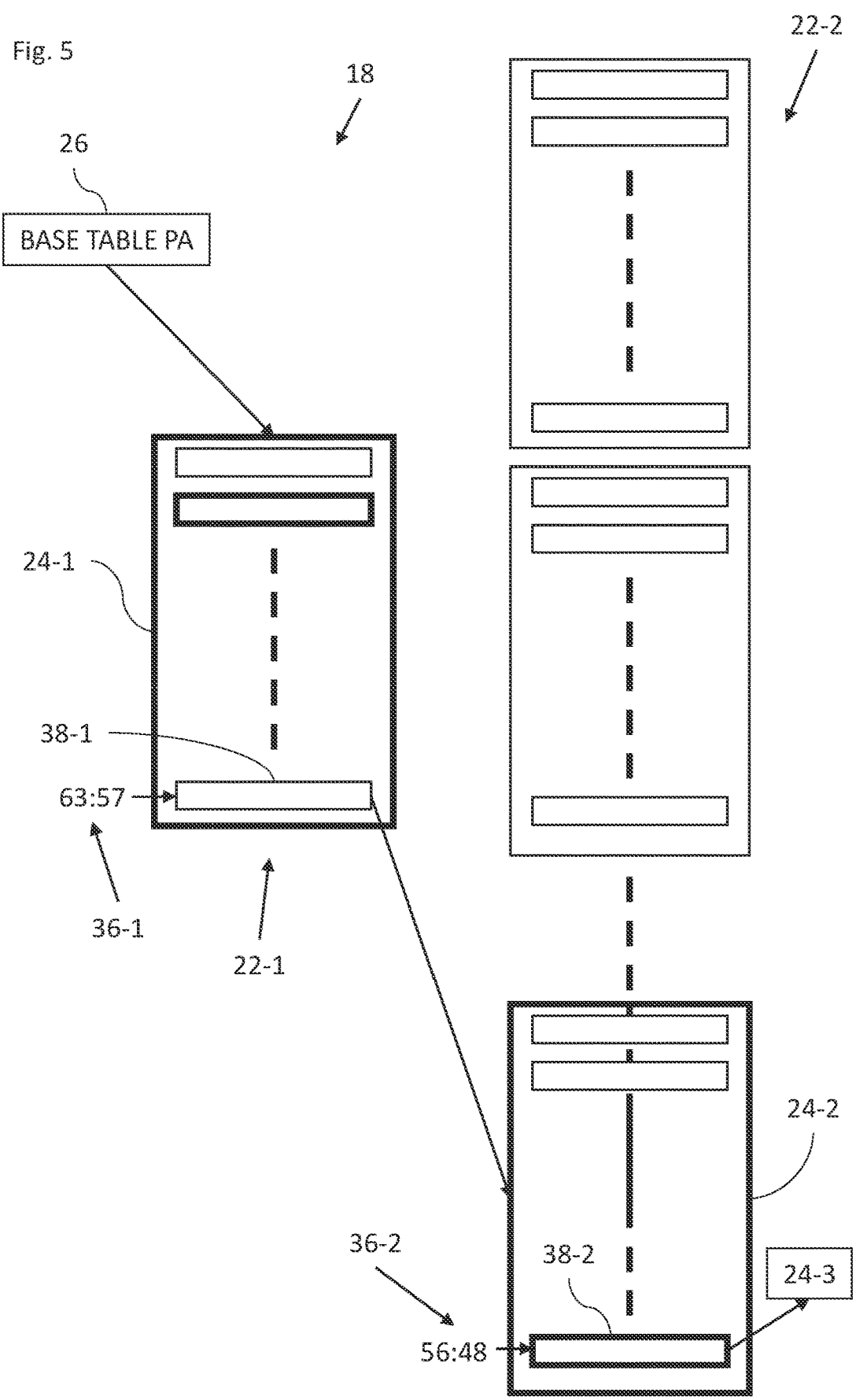

Reference is now made to FIGS. 4-5, which are schematic representations of the active multilevel page table 18 of FIG. 2 illustrating how a virtual memory address 30 is mapped to a physical memory address 32. FIG. 4 shows that the virtual memory address 30 includes multiple parts 34. The base table page address register 26 gives the physical memory address of the page 24-1 in the first level 22-1 of the active MPT 18.

The page 24-1 is then retrieved from memory 14 (FIG. 1) and searched as follows. As shown in FIG. 5, a first part 34-1 (FIG. 4) of the virtual memory address 30, provides an index 36-1 (e.g., 63:57) of a PTE in page 24-1 that includes a physical memory address 38-1 of one of the pages 24-2 in the second level 22-2 of the active MPT 18, as shown in more detail in FIG. 5.

The page 24-2 is then retrieved from memory and searched as follows. A second part 34-2 of the virtual memory address 30, provides an index 36-2 (e.g., 56:48) of a PTE in page 24-2 that includes a physical memory address 38-2 of one of the pages 24-3 in the third level 22-3 of the active MPT 18, and so on.

The above is repeated for each of the parts 34 of the virtual memory address 30 for each of the levels 22 in the active MPT 18 until one of the pages 24-7 is found in the last level (level 22-7). The seventh part 34-7 of the virtual memory address 30, provides an index 36-7 (e.g., 11:0) of a PTE in page 24-7 that includes the physical memory address 32 of one of the memory pages 16. In the above manner the virtual memory address 30 is mapped to the physical memory address 32 of one of the memory pages 16.

Figure 6:
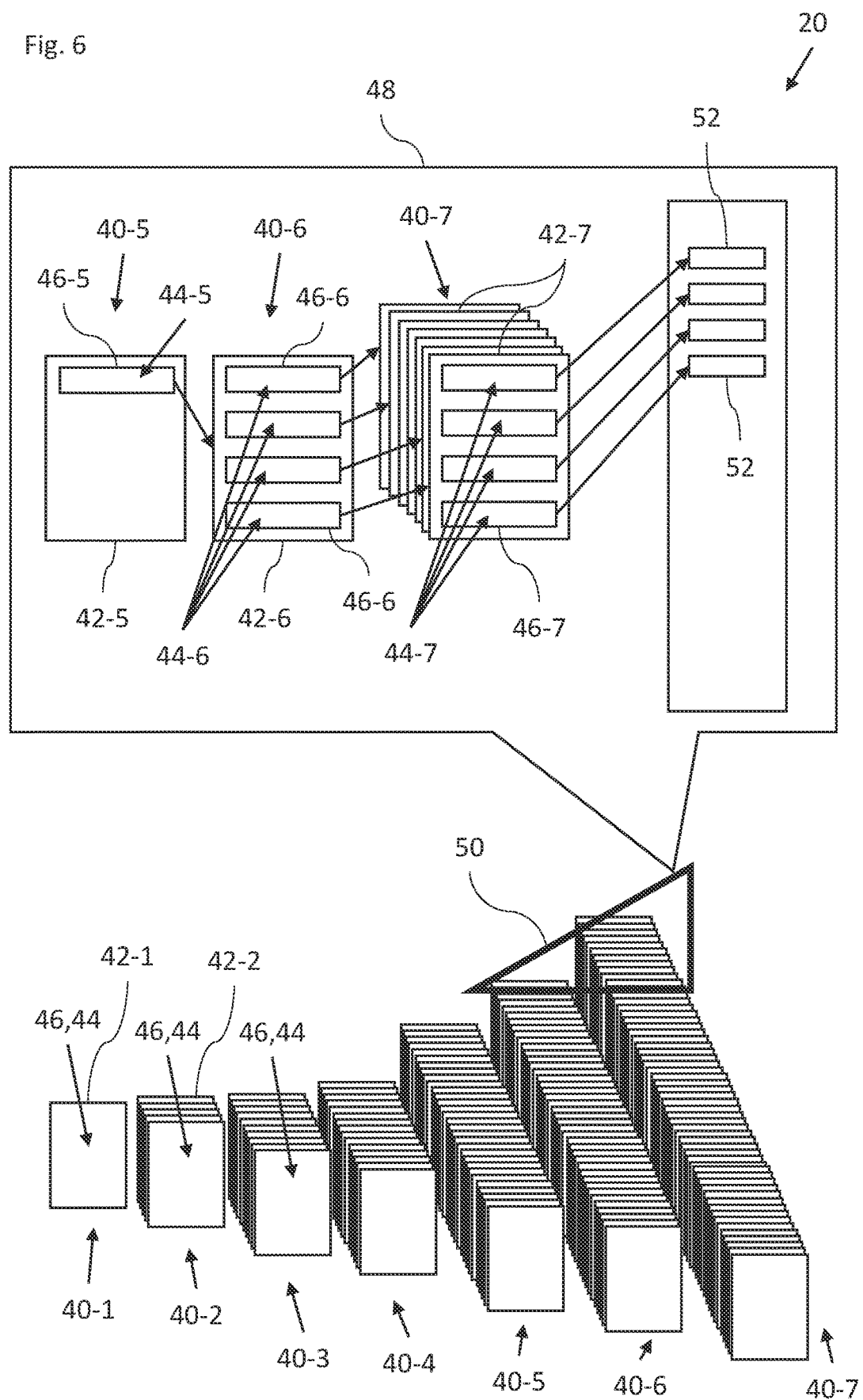
FIG. 6 is a schematic representation of a floating multilevel page table for use in the device of FIG. 1.

Reference is now made to FIG. 6, which is a schematic representation of the floating MPT 20 for use in the device 10 of FIG. 1. The floating MPT 20 has substantially the same structure as the active MPT 18. The floating MPT 20 includes multiple levels 40. The first level 40-1 of the floating MPT 20 includes one page 42-1, which has PTEs 46 including physical memory addresses 44 of pages 42-2 in the next lower level 40-2 of the floating MPT 20. Lower levels 40 of the floating MPT 20 include multiple pages 42 having physical memory addresses 44 referenced by PTEs 46 included in pages 42 in the level above that level 40.

An insert 48 in FIG. 6 shows a portion 50 of the floating MPT 20. A PTE 46-5 in a page 42-5 in the fifth level 40-5 of the floating MPT 20 includes physical memory address 44-5 of a page 42-6 in sixth level 40-6 of the floating MPT 20. Page 42-6 includes PTEs 46-6 (only some labeled for the sake of simplicity) that include physical memory addresses 44-6 of pages 42-7 (only some labeled for the sake of simplicity) in seventh level 40-7. The page 42-7 includes PTEs 46-7 (only one labeled for the sake of simplicity) that include physical memory addresses 44-7 of spare memory pages 52 (only some labeled for the sake of simplicity) stored in the memory 14 (FIG. 1).

Figure 7:
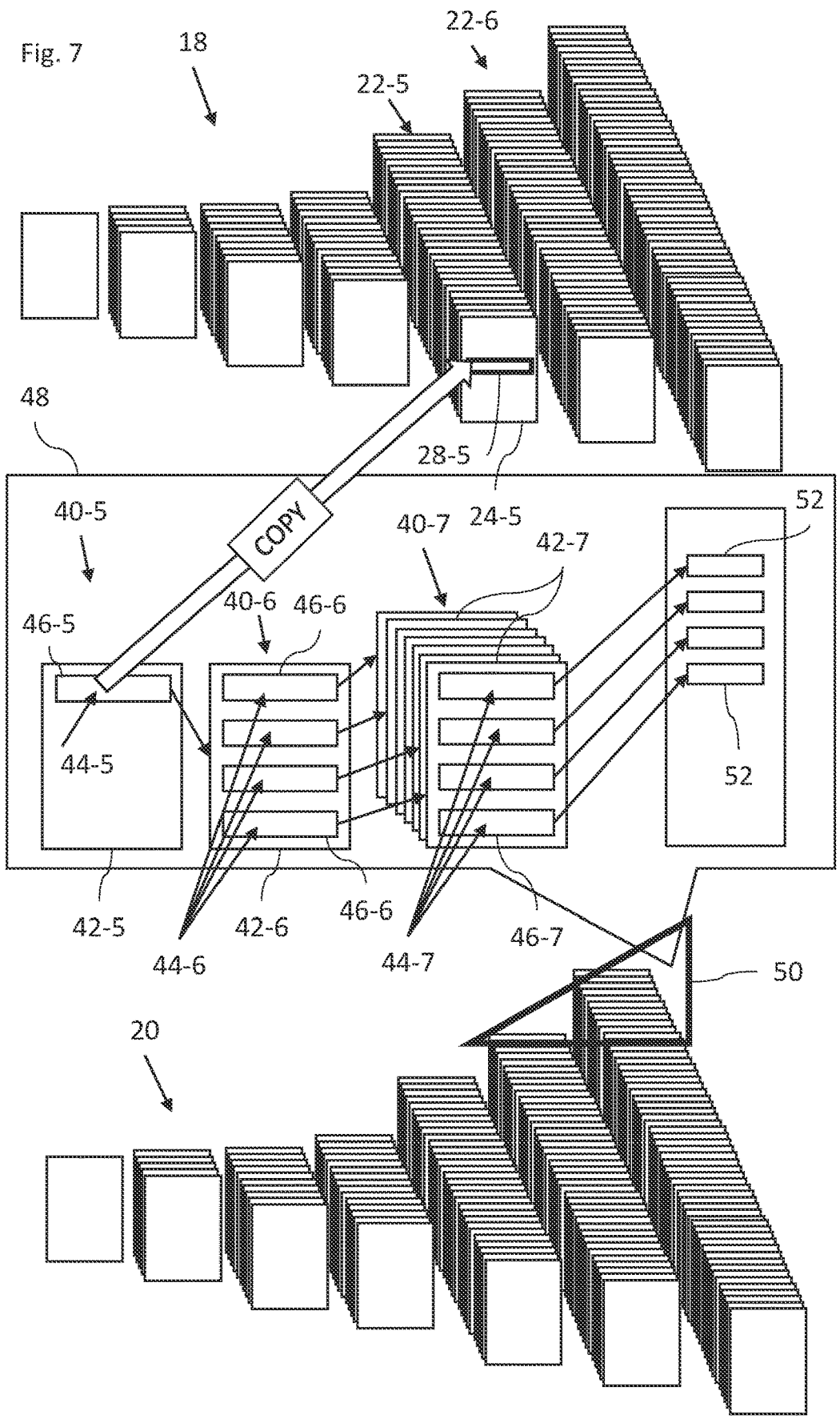
FIG. 7 is a schematic representation of the active and floating multilevel page tables illustrating adjoining at least part of the floating multilevel page table to the active multilevel page table.

Reference is now made to FIG. 7, which is a schematic representation of the active MPT 18 and the floating MPT 20 illustrating adjoining at least part of the floating MPT 20 to the active MPT 18. The floating MPT 20, or part thereof, may be adjoined to the active MPT 18 to provide additional virtual to physical memory address mappings to spare memory pages 52 in the active MPT 18. Adjoining (part of) the floating MPT 20 to the active MPT 18 may be performed by copying one or more PTEs 46 from the floating MPT 20 (e.g., in level 40-6 or higher, such as level 40-5) to one of the pages 24 in the same level 22 in the active MPT 18.

For example, 256 last hop (level 40-7) pages 42-7 are referenced in one penultimate hop (level 40-6) page 42-6 (e.g., either in the first half or the second half of that penultimate page 42-6) of the floating MPT 20. Therefore, just copying the 256 PTEs 46-6 from the floating MPT 20 to 256 PTEs in a page 24 of the same level 22-6 of the active MPT 18 provides references to the 256 last hop MPT pages 42-7 of the floating MPT 20 in the active MPT 18, and thereby provides virtual to physical address mapping to 128K spare memory pages 52 (or 512 MB) in the active MPT 18.

Similarly, virtual to physical address mapping may be provided for 256K spare memory pages 52 (or 1 GB), by copying the single PTE 46-5 in the level 40-5 above the penultimate level 40-6 in the floating MPT 20 to PTE 28-5 of page 24-5 in the level 22-5 above the penultimate level 22-6 in the active MPT 18. Thereby providing virtual to physical address mapping to 256K spare memory pages 52 (or 1 GB) in the active MPT 18.

The quantity of spare memory pages 52 mapped is generally equal to $2^n$, where n is an integer, and the virtual memory addresses of the spare memory pages 52 being mapped in the active MPT 18 are aligned such that n least significant bits of each of the virtual memory addresses are equal to zero.

Figure 8:
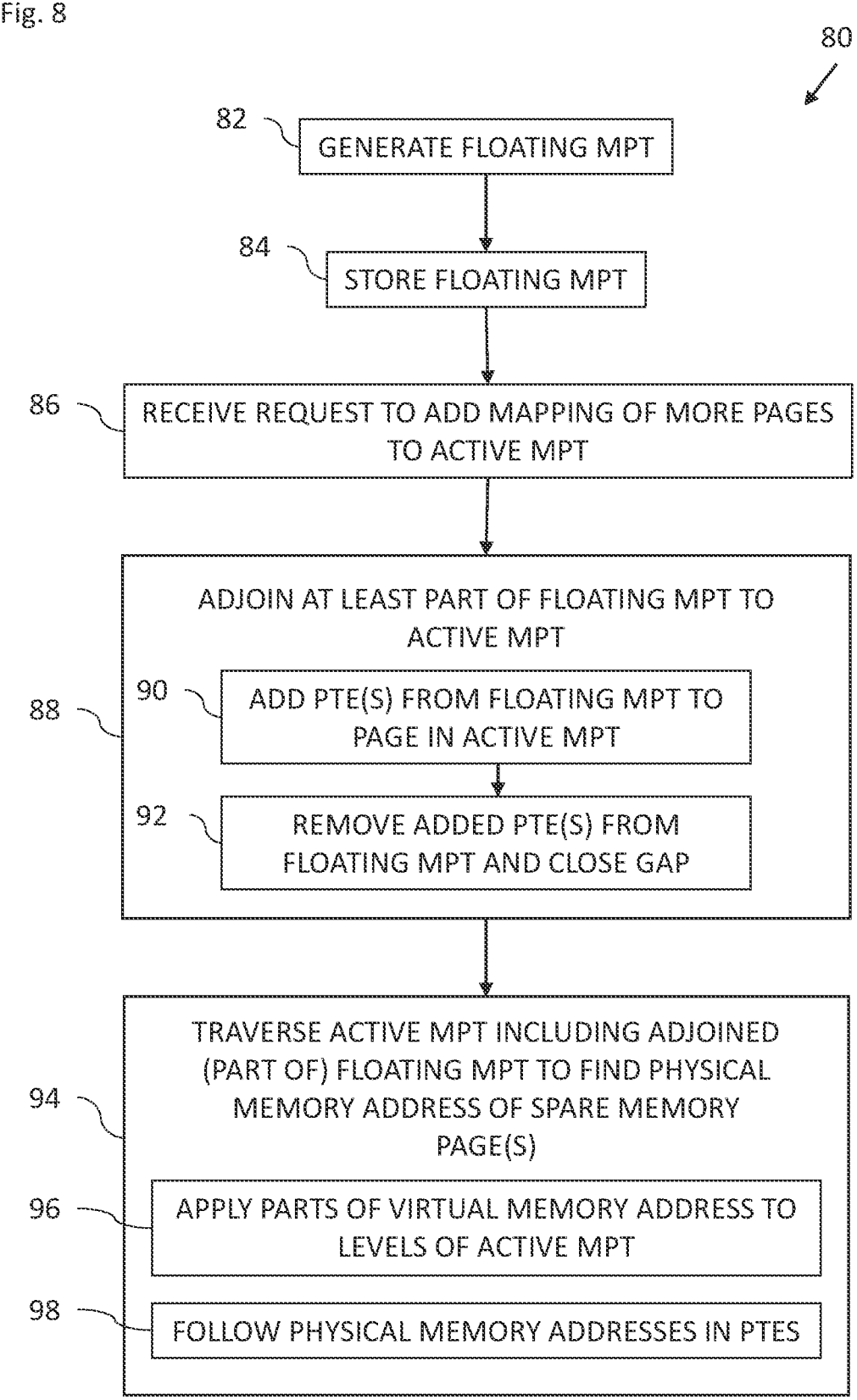
FIG. 8 is a flowchart including steps in a method of use of the device of FIG. 1.

Reference is now made to FIG. 8, which is a flowchart 80 including steps in a method of use of the device 10 of FIG. 1. Reference is also made to FIG. 1. The processor 12 is configured to generate the floating MPT 20 (block 82) and store the floating MPT 20 in the memory 14 (block 84). In some embodiments, the floating MPT 20 has the same number of levels as the active MPT 18. In other embodiments, the floating MPT 20 has a different number of levels from the active MPT 18. The processor 12 is configured to receive a request to add virtual to physical address mapping for more memory pages of the plurality of memory pages 16 to the active MPT 18 (block 86).

In response to receiving the request, the processor 12 is configured to adjoin at least part of the floating MPT 20 to the active MPT 18 so that the active MPT 18 provides the virtual to physical address mapping for at least some memory pages of the spare memory pages 52 (FIG. 6) (block 88). The processor 12 is configured to add a mapping of the at least some memory pages of the spare memory pages 52 to the active MPT 18 in accordance with a minimum memory size. For example, 512 MB or 1 GB.

The processor 12 is configured to add at least one PTE 46 (e.g., PTE 46-5 of FIG. 7) that exists in the floating MPT 20 to a given page (e.g., page 24-5 of FIG. 7) of the active MPT 18 in order to add the virtual to physical address mapping for the at least some memory pages of the spare memory pages 52 to the active MPT 18 (block 90). The added PTE(s) provides the physical memory address(es) of page(s) 42 (e.g., pages 42-6 or 42-7 of FIG. 7) of the floating MPT 20, which includes PTEs 46 providing physical memory addresses of: the at least some memory pages of the spare memory pages 52; or pages in a lower level 40 (e.g., level 40-7 of FIG. 7) of the floating MPT 20. The processor 12 is configured to remove the PTE(s) added to the active MPT 18 from the floating MPT 20 and close a gap in the floating MPT 20 created by removing the PTE(s) from the floating MPT 20 (block 92).

The processor 12 is configured to traverse the active MPT 18 (now including the adjoined (part of the) floating MPT 20), in order to translate a given virtual memory address to a given physical memory address of a given one of the spare memory pages 52 (block 94). The given virtual memory address includes parts (e.g., parts 34 shown in FIG. 4). The processor 12 is configured to traverse the active MPT 18 to find the given physical memory address of the given spare memory corresponding levels 22 of the active MPT 18 (block 96). For example, part 34-1 is applied in page 24-1, part 34-2 is applied in a page 24 in level 22-2, and so on, as described above in more detail with reference to FIGS. 4 and 5. The processor 12 is configured to follow physical memory addresses 38 in page table entries (PTEs) 28 in corresponding levels 22 of the active MPT 18 to find the given physical memory address of the given spare memory page 52 (block 98). The indices 36 of the PTEs 28 in the corresponding levels 22 of the active MPT 18 are indicated by the parts 34 of the given virtual memory address.

The mapping of unused memory pages may be removed from the active MPT 18, by the processor 12 being configured to remove at least one PTE that exists in the active MPT 18 to a given page of the floating MPT 20 in order to remove the virtual to physical address mapping for the unused memory pages from the active MPT 18 to the floating MPT 20. The removal of mappings of unused pages from the active MPT 18 is performed in a similar manner to the adding of mapping of spare memory pages to the active MPT 18 from the floating MPT 20 as described above with reference to FIG. 8.

In practice, some, or all of the functions of the processor 12 may be combined in a single physical component or, alternatively, implemented using multiple physical components. These physical components may comprise hard-wired or programmable devices, or a combination of the two. In some embodiments, at least some of the functions of the processor 12 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A processing device, comprising:
a memory to:
store a plurality of memory pages having corresponding physical memory addresses in the memory;
store an active multilevel page table (MPT) mapping virtual memory addresses to physical memory addresses for corresponding allocated memory pages of the plurality of memory pages stored in the memory; and
store a floating MPT at least partially mapping virtual memory addresses to physical memory addresses for corresponding spare memory pages of the plurality of memory pages stored in the memory, the floating MPT and the active MPT using a common mapping scheme; and
a processor to:
receive a request to add a virtual to physical address mapping for more memory pages of the plurality of memory pages to the active MPT; and
in response to receiving the request, adjoin at least part of the floating MPT to the active MPT so that the active MPT provides the virtual to physical address mapping for at least some memory pages of the spare memory pages.

2. The device according to claim 1, wherein the processor is to generate the floating MPT and store the floating MPT in the memory.

3. The device according to claim 1, wherein the processor is to add at least one page table entry (PTE) that exists in the floating MPT to a given page of the active MPT in order to add the virtual to physical address mapping for the at least some memory pages of the spare memory pages to the active MPT.

4. The device according to claim 3, wherein the at least one PTE provides a physical memory address of at least one page of the floating MPT, which includes PTEs providing physical memory addresses of: the at least some memory pages of the spare memory pages; or pages in a lower level of the floating MPT.

5. The device according to claim 3, wherein the processor is to remove the at least one PTE from the floating MPT.

6. The device according to claim 5, wherein the processor is to close a gap in the floating MPT created by removing the at least one PTE from the floating MPT.

7. The device according to claim 1, wherein the processor is to traverse the active MPT including the adjoined at least part of the floating MPT, in order to translate a given virtual memory address to a given physical memory address of a given one of the spare memory pages.

8. The device according to claim 7, wherein:
the given virtual memory address includes parts; and
the processor is to traverse the active MPT to find the given physical memory address of the given spare memory page based on applying the parts of the given virtual memory address to corresponding levels of the active MPT.

9. The device according to claim 8, wherein:
the processor is to follow physical memory addresses in page table entries (PTEs) in corresponding levels of the active MPT to find the given physical memory address of the given spare memory page;
indices of the PTEs in the corresponding levels of the active MPT are indicated by the parts of the given virtual memory address.

10. The device according to claim 1, wherein the active MPT and the floating MPT are tree data structures.

11. The device according to claim 1, wherein: a quantity of the at least some memory pages of the spare memory pages being mapped is equal to 2 to the power of an integer number n; and the virtual memory addresses of the at least some memory pages being mapped in the active MPT are aligned such that n least significant bits of each of the virtual memory addresses are equal to zero.

12. The device according to claim 1, wherein the processor is to add a mapping of the at least some memory pages of the spare memory pages to the active MPT in accordance with a minimum memory size.

13. The device according to claim 1, wherein the processor is to remove at least one page table entry (PTE) that exists in the active MPT to a given page of the floating MPT in order to remove a virtual to physical address mapping for unused memory pages from the active MPT to the floating MPT.

14. A method, comprising:
storing a plurality of memory pages having corresponding physical memory addresses in a memory;
storing an active multilevel page table (MPT) mapping virtual memory addresses to physical memory addresses for corresponding allocated memory pages of the plurality of memory pages stored in the memory; and
storing a floating MPT at least partially mapping virtual memory addresses to physical memory addresses for corresponding spare memory pages of the plurality of memory pages stored in the memory, the floating MPT and the active MPT using a common mapping scheme; and
receiving a request to add a virtual to physical address mapping for more memory pages of the plurality of memory pages to the active MPT; and
in response to receiving the request, adjoining at least part of the floating MPT to the active MPT so that the active MPT provides the virtual to physical address mapping for at least some memory pages of the spare memory pages.

15. The method according to claim 14, further comprising generating the floating MPT.

16. The method according to claim 14, further comprising adding at least one page table entry (PTE) that exists in the floating MPT to a given page of the active MPT in order to add the virtual to physical address mapping for the at least some memory pages of the spare memory pages to the active MPT.

17. The method according to claim 16, wherein the at least one PTE provides a physical memory address of at least one page of the floating MPT, which includes PTEs providing physical memory addresses of: the at least some memory pages of the spare memory pages; or pages in a lower level of the floating MPT.

18. The method according to claim 16, further comprising removing the at least one PTE from the floating MPT.

19. The method according to claim 18, further comprising closing a gap in the floating MPT created by removing the at least one PTE from the floating MPT.

20. The method according to claim 14, further comprising traversing the active MPT including the adjoined at least part of the floating MPT, in order to translate a given virtual memory address to a given physical memory address of a given one of the spare memory pages.

21. The method according to claim 20, wherein:
the given virtual memory address includes parts; and
the traversing includes traversing the active MPT to find the given physical memory address of the given spare memory page based on applying the parts of the given virtual memory address to corresponding levels of the active MPT.

22. The method according to claim 21, further comprising following physical memory addresses in page table entries (PTEs) in corresponding levels of the active MPT to find the given physical memory address of the given spare memory page, wherein the indices of the PTEs in the corresponding levels of the active MPT are indicated by the parts of the given virtual memory address.

23. The method according to claim 14, wherein the active MPT and the floating MPT are tree data structures.

24. The method according to claim 14, wherein a quantity of the at least some memory pages of the spare memory pages being mapped is equal to 2 to the power of an integer number n; and the virtual memory addresses of the at least some memory pages being mapped in the active MPT are aligned such that n least significant bits of each of the virtual memory addresses are equal to zero.

25. The method according to claim 14, further comprising adding a mapping of the at least some memory pages of the spare memory pages to the active MPT in accordance with a minimum memory size.

26. The method according to claim 14, further comprising removing at least one page table entry (PTE) that exists in the active MPT to a given page of the floating MPT in order to remove a virtual to physical address mapping for unused memory pages from the active MPT to the floating MPT.

* * * * *